(12) United States Patent
Huang

(10) Patent No.: US 11,786,959 B2
(45) Date of Patent: Oct. 17, 2023

(54) DOUBLE-SIDED EXPANDED PLATE RIVETING STRUCTURE AND METHOD

(71) Applicant: Huizhou Hanxu Hardware & Plastic Technology Co., Ltd., Guangdong (CN)

(72) Inventor: Tsung-Hsien Huang, Guangdong (CN)

(73) Assignee: HUIZHOU HANXU HARDWARE & PLASTIC TECHNOLOGY CO., LTD., Guangdong (CN)

( * ) Notice: Subject to any disclaimer, the term of this patent is extended or adjusted under 35 U.S.C. 154(b) by 860 days.

(21) Appl. No.: 16/659,481

(22) Filed: Oct. 21, 2019

(65) Prior Publication Data

US 2021/0114082 A1  Apr. 22, 2021

(51) Int. Cl.
  *B23P 15/26*  (2006.01)
  *B21J 15/04*  (2006.01)
  *F28F 3/02*  (2006.01)

(52) U.S. Cl.
  CPC ............. *B21J 15/04* (2013.01); *B23P 15/26* (2013.01); *F28F 3/02* (2013.01)

(58) Field of Classification Search
  CPC ... B21J 15/04; B23P 15/26; F28F 3/02; B21K 25/00; B21D 52/03
  USPC .................. 29/890.03, 890.045, 890.046
  See application file for complete search history.

(56) References Cited

U.S. PATENT DOCUMENTS

| | | | | |
|---|---|---|---|---|
| 5,014,776 | A * | 5/1991 | Hess | F28F 3/022 165/185 |
| 6,000,462 | A * | 12/1999 | Conner | H01L 23/3672 165/185 |
| 6,279,648 | B1 * | 8/2001 | Diels | H01L 21/4882 257/E23.102 |
| 6,742,581 | B2 * | 6/2004 | Mochizuki | H01L 21/4882 174/16.3 |
| 6,776,224 | B1 * | 8/2004 | Chen | H01L 23/3672 257/722 |
| 7,497,013 | B2 * | 3/2009 | Zaghlol | H01L 21/4882 165/185 |
| 8,555,952 | B2 * | 10/2013 | Huang | H01L 21/4882 165/80.3 |
| 9,297,597 | B2 * | 3/2016 | Huang | F28F 3/06 |
| 9,475,156 | B2 * | 10/2016 | Lin | B23P 15/26 |
| 11,525,637 | B2 * | 12/2022 | Wiedenhoefer | F28F 3/025 |
| 2007/0074850 | A1 * | 4/2007 | Peschl | H01L 23/367 257/E23.102 |
| 2008/0060793 | A1 * | 3/2008 | Huang | H01L 23/3672 29/890.032 |
| 2009/0032234 | A1 * | 2/2009 | Wayman | H01L 23/367 165/185 |
| 2009/0145580 | A1 * | 6/2009 | Lin | H01L 23/3672 29/890.03 |

(Continued)

*Primary Examiner* — Sarang Afzali
*Assistant Examiner* — Darrell C Ford
(74) *Attorney, Agent, or Firm* — Leong C. Lei

(57) ABSTRACT

A double-sided expanded plate riveting structure and a double-sided expanded plate riveting method are disclosed. By providing an upright portion, a bottom end of the upright portion is bent toward at least one side to form a folded portion, and at least one side of the folded portion partially extends beyond a plane corresponding to an outer side of an expanded structure for a press head to perform a pressing operation, which effectively avoids a bend and deformation of a double-sided expanded plate in the riveting process.

4 Claims, 4 Drawing Sheets

(56) References Cited

U.S. PATENT DOCUMENTS

| | | | |
|---|---|---|---|
| 2009/0194255 A1* | 8/2009 | Huang | G06F 1/20 165/104.33 |
| 2011/0168374 A1* | 7/2011 | Watanabe | H01L 23/3672 165/185 |
| 2013/0105132 A1* | 5/2013 | Huang | H01L 21/4882 165/185 |
| 2013/0206381 A1* | 8/2013 | Huang | F28F 3/06 165/185 |
| 2014/0034279 A1* | 2/2014 | Lin | F28F 7/00 165/185 |
| 2014/0311712 A1* | 10/2014 | Huang | H01L 21/4882 165/185 |
| 2015/0000880 A1* | 1/2015 | Gosh | F28F 1/128 165/151 |
| 2015/0136363 A1* | 5/2015 | Huang | F28F 3/02 165/185 |
| 2017/0184060 A1* | 6/2017 | Cho | F28F 3/025 |
| 2020/0206803 A1* | 7/2020 | Huang | F28F 3/06 |
| 2020/0326142 A1* | 10/2020 | Huang | B21D 53/022 |

* cited by examiner

DOUBLE-SIDED EXPANDED PLATE RIVETING STRUCTURE AND METHOD

BACKGROUND OF THE INVENTION

1. Field of the Invention

The present invention relates to a heat sink, and more particularly to a double-sided expanded plate riveting structure and method.

2. Description of the Prior Art

In general, a conventional heat sink comprises a plurality of fins and a base. The fins are coupled to the base by soldering or by pressing. The fins are first inserted in preset grooves or clamping seat, and then pressed by a press head so that the fins are clamped and combined with the grooves (or the clamping seat) of the base. For example, as disclosed in U.S. Pat. No. 5,014,776, the respective two side walls of the grooves are pressed to cause a deformation to clamp the fins, such that the fins and the base are coupled to each other.

In the above patent, through the deformation of both sides of the groove, the root portion of the fin is clamped. However, the clamping force is concentrated at the deformation positions on both sides of the opening of the groove, only having two point-like clamping forces. Therefore, the clamping effect is not good and it is not easy to ensure its stable connection. The fins may have different heights, and the fins are prone to shaking or falling.

Another fin is formed with a folded portion by directly bending the end of the fin. The folded portion is pressed by a press head, so that the fin is coupled to the base. For example, Chinese Utility Model Application No. 201820031179.0 discloses a double-sided expanded plate and a riveting structure of the double-sided expanded plate. The double-sided expanded plate is equivalent to a fin, which further improves the heat dissipation efficiency. The double-sided expanded plate has a neck. The neck is formed with a meandering structure. The purpose of this design is only to prevent the expanded structure of the double-sided expanded plate from blocking the press-riveting position, so that the press-riveting tool can move down for press-riveting. Since the double-sided expanded plate needs to form a neck having a meandering structure, it is prone to cause a bend and deformation of the double-sided expanded plate in the riveting process. Besides, after the double-sided expanded plate is embedded, it is difficult to ensure the parallelism between adjacent two-sided expanded plates. This will affect the air flow and reduce the heat dissipation efficiency of the product. Accordingly, the inventor of the present invention has devoted himself based on his many years of practical experiences to solve these problems.

SUMMARY OF THE INVENTION

In view of the shortcomings of the prior art, the primary object of the present invention is to provide a double-sided expanded plate riveting structure and method, which can effectively solve the problem that the existing double-sided expanded plate is prone to be bent and deformed in the riveting process and the problem that it is difficult to guarantee the parallelism between adjacent two-sided expanded plates.

In order to achieve the above object, the present invention adopts the following technical solutions:

According to one aspect of the present invention, a double-sided expanded plate riveting structure is provided. The double-sided expanded plate riveting structure comprises a base and a plurality of double-sided expanded plates. A surface of the base is formed with a plurality of spaced grooves for the respective double-sided expanded plates to be inserted therein. The double-sided expanded plates each include a main body. The main body extends vertically and is perpendicular to the surface of the base. An expanded structure is formed on either side of the main body. A bottom of the main body is provided with an upright portion extending vertically. The upright portion is perpendicular to the surface of the base. A bottom end of the upright portion is bent toward at least one side to form a folded portion. At least one side of the folded portion partially extends beyond a plane corresponding to an outer side of the expanded structure. The bottom end of the upright portion and the folded portion are mated with and embedded in a corresponding one of the grooves of the base.

After the folded portion of each double-sided expanded plate is inserted in the corresponding groove of the base, a press head is aligned with the folded portion to perform a pressing operation. The press head covers the folded portion. After performing the pressing operation, the folded portion is pressed down in the corresponding groove to be deformed, expanded and fitted in the corresponding groove tightly, so as to complete riveting of each double-sided expanded plate and the base.

According to another aspect of the present invention, a double-sided expanded plate riveting method is provided. The double-sided expanded plate riveting method comprises the steps of:

(1) providing a base and a plurality of double-sided expanded plates, the double-sided expanded plates each including a main body, the main body extending vertically and being perpendicular to a surface of the base, an expanded structure being formed on either side of the main body, a bottom of the main body being provided with an upright portion extending vertically, the upright portion being perpendicular to the surface of the base, a root portion of each of the double-sided expanded plates being bent to form a folded portion, at least one side of the folded portion partially extending beyond a plane corresponding to an outer side of the expanded structure;

(2) embedding a bottom end of the upright portion and the folded portion in a groove of the base;

(3) providing a press head to be aligned with the folded portion to perform a pressing operation, the press head covering the folded portion, after performing the pressing operation, the folded portion being pressed down in the groove to be deformed, expanded and fitted in the groove tightly, so as to complete riveting of each double-sided expanded plate and the base.

Compared with the prior art, the present invention has obvious advantages and beneficial effects. Specifically, it can be known from the above technical solutions:

1. By providing the upright portion, the bottom end of the upright portion is bent toward at least one side to form the folded portion, and at least one side of the folded portion partially extends beyond a plane corresponding to the outer side of the expanded structure for a press head to perform a pressing operation, which effectively avoids a bend and deformation of the double-sided expanded plate in the riveting process. In addition, after the double-sided expanded plate is embedded, the parallelism between the adjacent two-side expanded plates can be effectively kept for the air to flow smoothly, thereby improving the heat dissipation efficiency of the product.

2. By providing the press head that is an oblique slider capable of avoiding the expanded structure, when the press head is in contact with the bottom of the expanded structure, the press head is displaced to get contact with the upright portion, which facilitates the press head to act on the folded portion. The folded portion has a side that partially extends beyond a plane corresponding to an outer side of the expanded structure, and such an extended side is at such a location that the press head that first moves downward along a linear path would contact a top end of the expanded side to be positioned thereon, and then the press head is sideways displaced to get contact with the upright portion, wherein the press head gets contact with the extended side portion before the sideways displacement that brings the press head toward the upright portion, so that the press head can be more effectively acting on the folded portion to have the folded portion better riveted and fixed to the base better, and the structure is more stable.

DETAILED DESCRIPTION OF THE PREFERRED EMBODIMENTS

Figure 1:
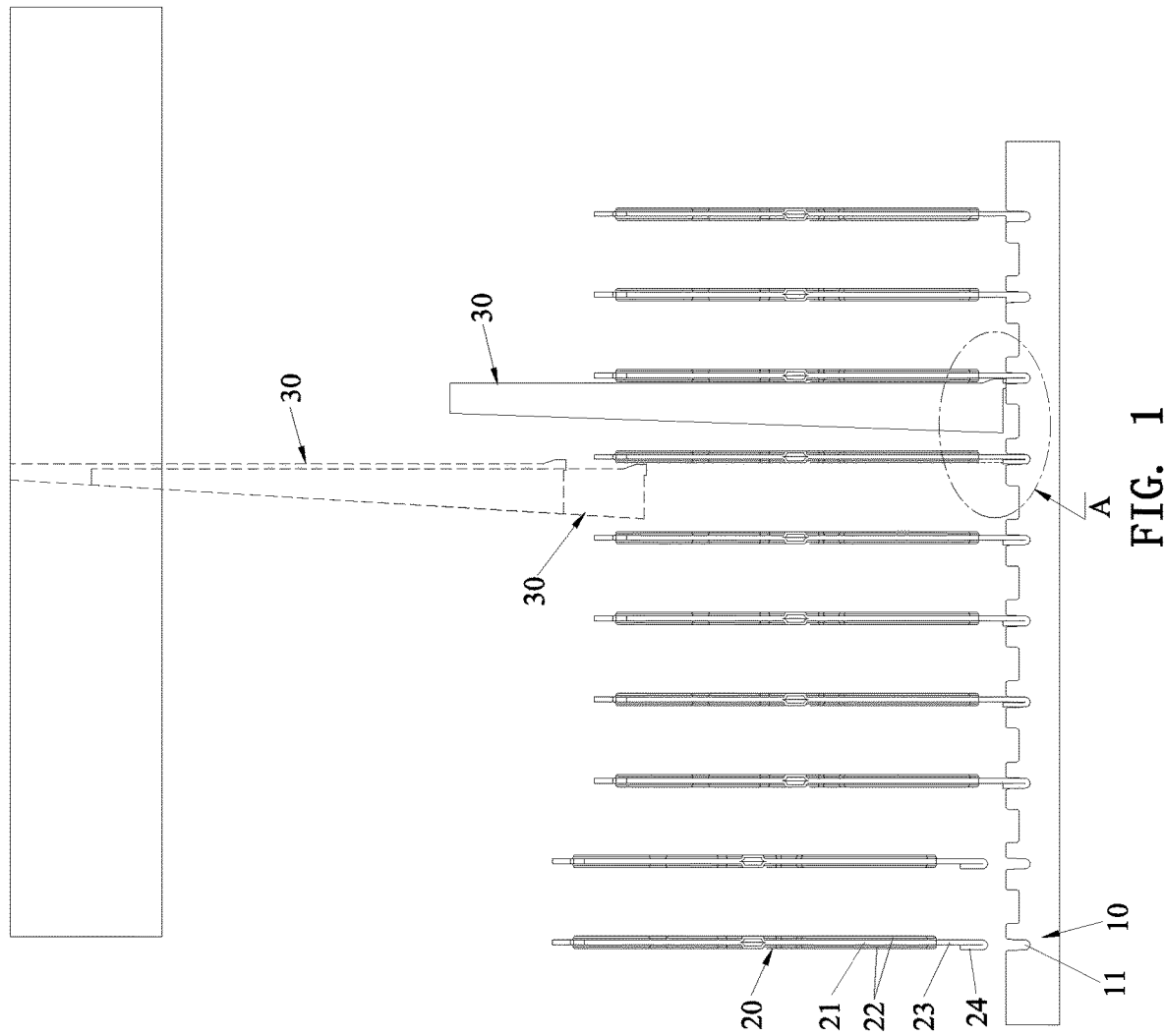
FIG. 1 is a schematic view in accordance with a first embodiment of the present invention.
Figure 2:
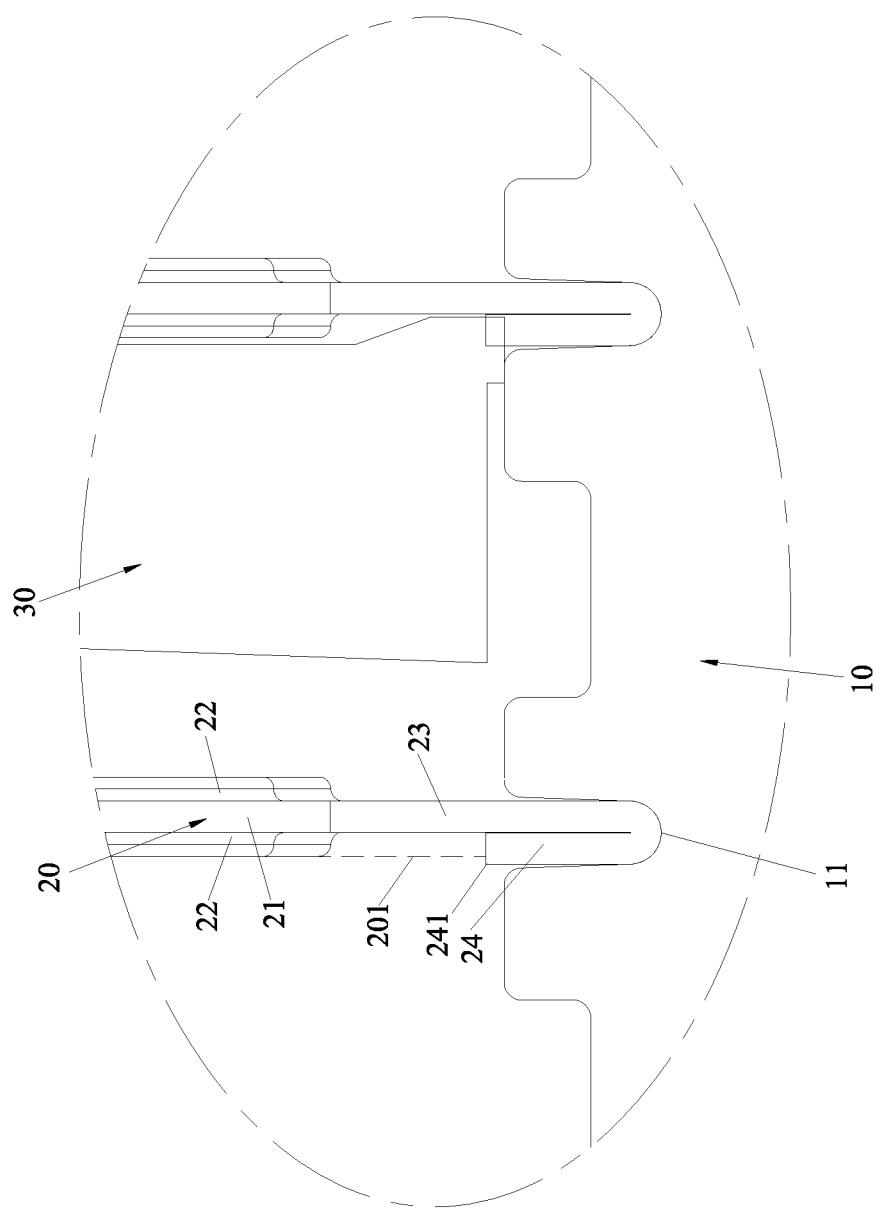
FIG. 2 is an enlarged view of circle A of FIG. 1.

Referring to FIG. 1 and FIG. 2, a double-sided expanded plate riveting structure in accordance with a first embodiment of the present invention comprises a base 10 and a plurality of double-sided expanded plates 20.

The surface of the base 10 is formed with a plurality of spaced grooves 11 for the respective double-sided expanded plates 20 to be inserted therein. The base 10 is a made of copper, aluminum, copper-based alloy or aluminum-based alloy.

Each double-sided expanded plate 20 includes a main body 21. The main body 21 extends vertically and is perpendicular to the surface of the base 10. An expanded structure 22 is formed on either side of the main body 21. The bottom of the main body 21 is provided with an upright portion 23 extending vertically. The upright portion 23 is perpendicular to the surface of the base 10. The bottom end of the upright portion 23 is bent toward at least one side to form a folded portion 24. At least one side, designated at 241, of the folded portion 24 partially extends beyond a plane 201 corresponding to the outer side of the expanded structure 22. The bottom end of the upright portion 23 and the folded portion 24 are mated with and embedded in the groove 11 of the base 10. In this embodiment, the folded portion 24 is a one-segment folded portion located at one side of the bottom end of the upright portion 23.

Through the base 10 and the double-sided expanded plates 20, after the folded portion 24 of each double-sided expanded plate 20 is inserted in the corresponding groove 11 of the base 10, a press head 30 is aligned with the folded portion 24 to perform a pressing operation. The press head 30 covers the folded portion 24. After performing the pressing operation, the folded portion 24 is pressed down in the corresponding groove 11 to be deformed, expanded and fitted in the corresponding groove 11 tightly, so as to complete the riveting of each double-sided expanded plate 20 and the base 10.

The present invention further discloses a double-sided expanded plate riveting method, comprising the steps of:

(1) providing a base 10 and a plurality of double-sided expanded plates 20, each of the double-sided expanded plates 20 including a main body 21, the main body 21 extending vertically and being perpendicular to the surface of the base 10, an expanded structure 22 being formed on either side of the main body 21, the bottom of the main body 21 being provided with an upright portion 23 extending vertically, the upright portion 23 being perpendicular to the surface of the base 10, a root portion of each of the double-sided expanded plates 20 being bent to form a folded portion 24, at least one side of the folded portion 24 partially extending beyond a plane 201 corresponding to the outer side of the expanded structure 22;

(2) embedding the bottom end of the upright portion 23 and the folded portion 24 in a groove 11 of the base 10;

(3) providing a press head 30 to be aligned with the folded portion 24 to perform a pressing operation, the press head 30 covering the folded portion 24, after performing the pressing operation, the folded portion 24 being pressed down in the groove 11 to be deformed, expanded and fitted in the groove 11 tightly, so as to complete the riveting of each double-sided expanded plate 20 and the base 10. Wherein, the press head 30 is an oblique slider that can avoid the expanded structure 22. When the press head 30 reaches the bottom of the expanded structure 22, the press head 30 is first contacting a top end of the extended side 241 of the folded portion 24 and then sideways displaced to get contact with the upright portion 23, which facilitates the press head 30 to act on the folded portion 24.

Figure 3:
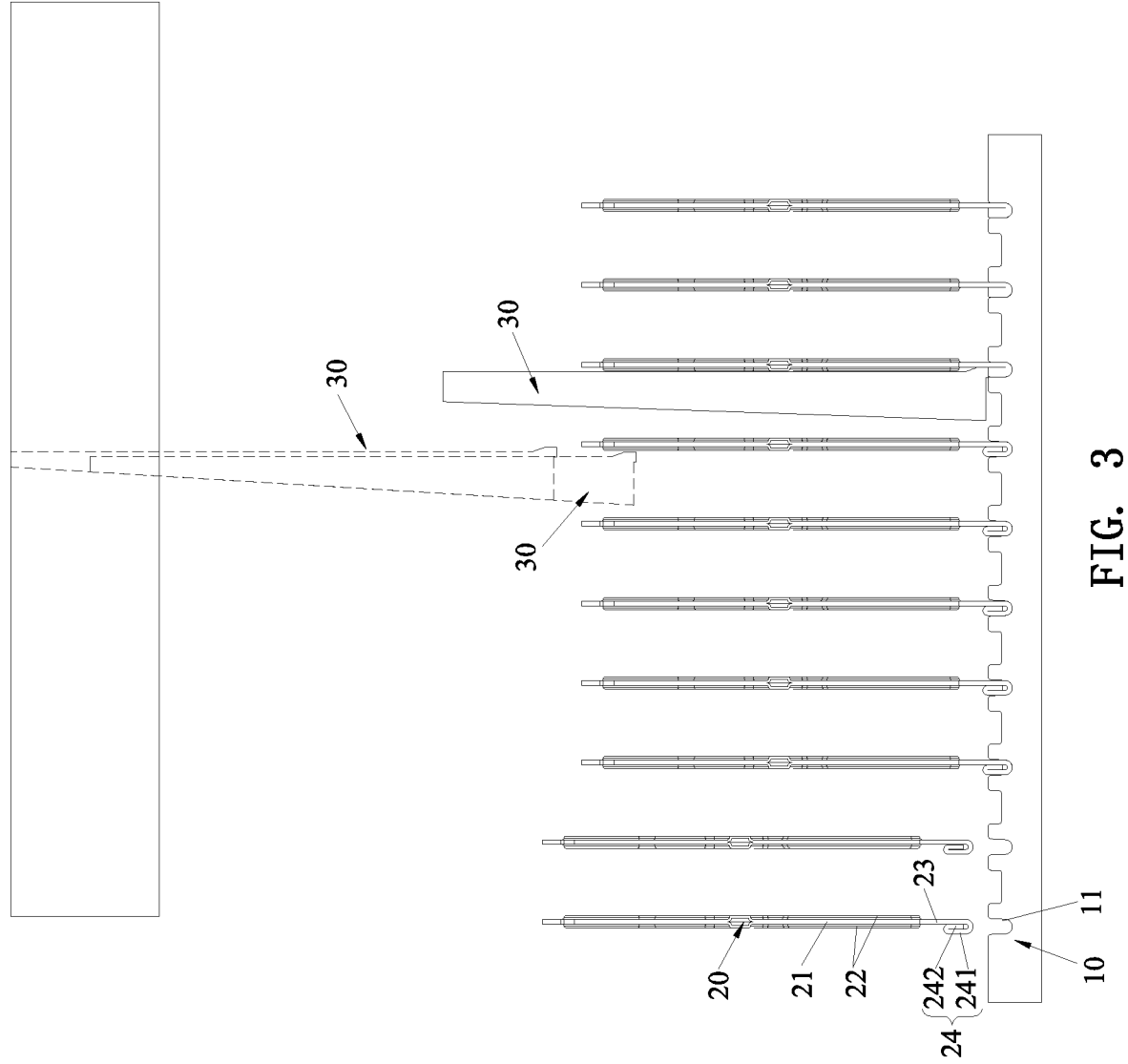
FIG. 3 is a schematic view in accordance with a second embodiment of the present invention.

Referring to FIG. 3 illustrates a double-sided expanded plate riveting structure in accordance with a second embodiment of the present invention. The second embodiment is substantially similar to the first embodiment with the exceptions described hereinafter.

In this embodiment, the folded portion 24 is a two-segment folded portion, including a first vertical segment 241 and a second vertical segment 242. Both the first vertical segment 241 and the second vertical segment 242 are located at one side of the bottom end of the upright portion 23. The lower end of the first vertical segment 241 is connected to the bottom end of the upright portion 23. The upper end of the first vertical segment 241 is connected to the upper end of the second vertical segment 242. The second vertical segment 242 is sandwiched between the first vertical segment 241 and the side of the bottom end of the upright portion 23. In this way, the folded portion 24 has a greater thickness, so that the structure is more secure after being riveted to the base 10.

Figure 4:
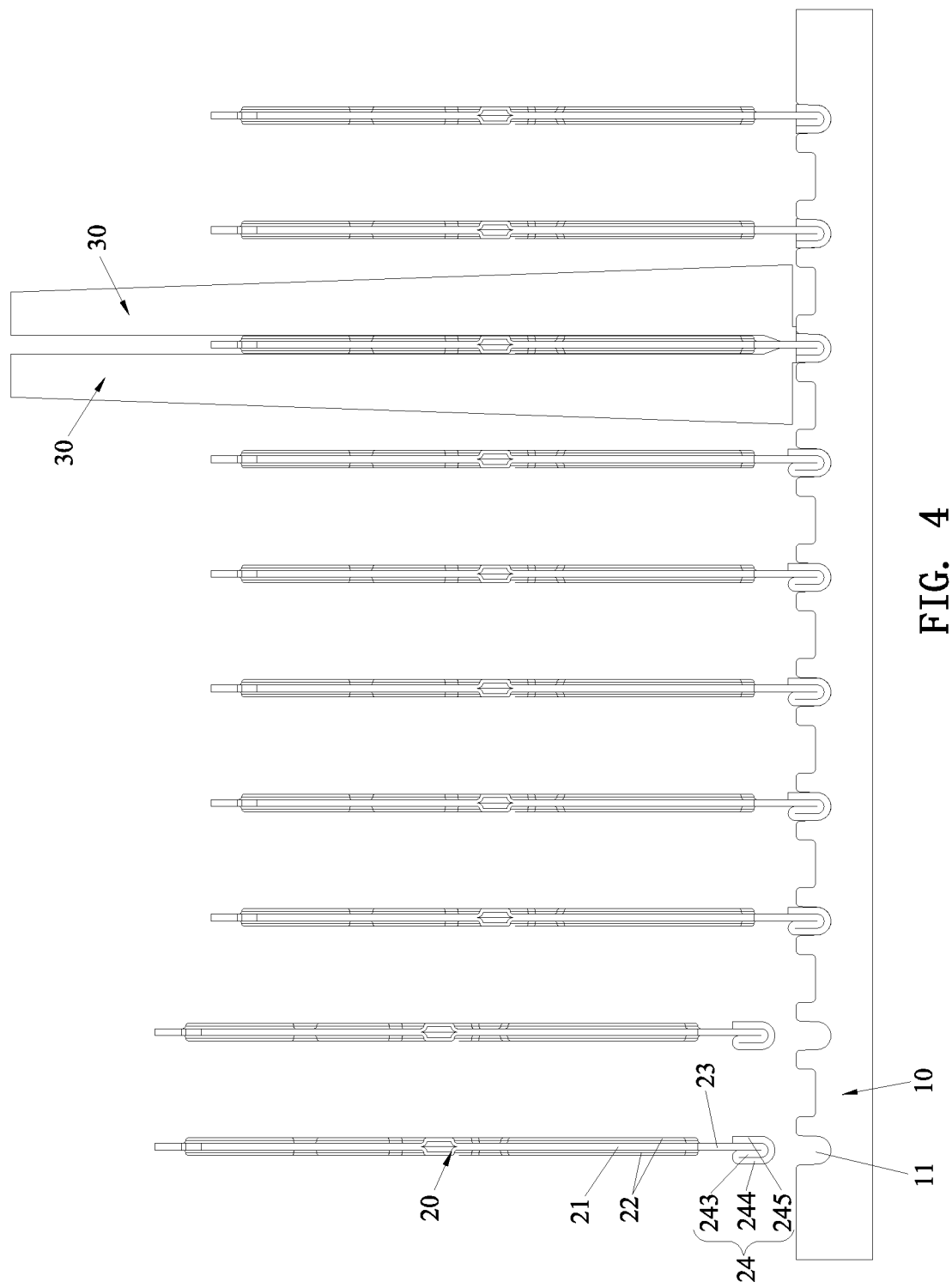
FIG. 4 is a schematic view in accordance with a third embodiment of the present invention.

Referring to FIG. 4 illustrates a double-sided expanded plate riveting structure in accordance with a third embodiment of the present invention. The third embodiment is substantially similar to the first embodiment with the exceptions described hereinafter.

In this embodiment, the folded portion 24 is a three-segment folded portion, including a first vertical segment 243, a second vertical segment 244 and a third vertical segment 245. Both the first vertical segment 243 and the second vertical segment 244 are located at one side of the bottom end of the upright portion 23. The lower end of the first vertical segment 243 is connected to the bottom end of the upright portion 23. The upper end of the first vertical segment 243 is connected to the upper end of the second vertical segment 244. The third vertical segment 245 is located at another side of the bottom end of the upright portion 23. The lower end of the third vertical segment 245 is connected to the lower end of the second vertical segment 244.

When riveting, two press heads 30 are symmetrically disposed corresponding to two sides of the double-sided expanded plate 20 and aligned with two sides of the folded portion 24 to perform the pressing operation. The pressing operation is more balanced, and the double-sided expanded plate 20 doesn't tilt toward one side, so that the connecting structure of the folded portion 24 and the base 10 is more firm after riveted.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A double-sided expanded plate riveting structure, comprising a base and a plurality of double-sided expanded plates; a surface of the base being formed with a plurality of spaced grooves for the respective double-sided expanded plates to be inserted therein, the double-sided expanded plates each including a main body, the main body extending vertically and being perpendicular to the surface of the base, an expanded structure being formed on either side of the main body, a bottom of the main body being provided with an upright portion extending vertically, the upright portion being perpendicular to the surface of the base, a bottom end of the upright portion being bent toward at least one side to form a folded portion, at least one side of the folded portion partially extending beyond a plane corresponding to an outer side of the expanded structure, the bottom end of the upright portion and the folded portion being mated with and embedded in a corresponding one of the grooves of the base;

wherein for each of the double-sided expanded plates, the main body extends vertically from a top of the upright portion and the expanded structures are arranged on two lateral sides of the main body, respectively, such that the outer side of one of the expanded structures defines the plane beyond which the at least one side of the folded portion sideways extends, wherein the plane covers an outermost portion of the outer side of the one of the expanded structure, and the at least one side of the folded portion partially extending beyond the plane comprises a portion located outboard of the plane, and wherein each double-sided expanded plate received in the corresponding groove of the base is adapted to be pressed by a press head that acts on the folded portion to perform a pressing operation, wherein the press head covers the folded portion, and the folded portion is pressed down in the corresponding groove to be deformed, expanded and fitted in the corresponding groove tightly.

2. The double-sided expanded plate riveting structure as claimed in claim 1, wherein the folded portion is a one-segment folded portion located at one side of the bottom end of the upright portion.

3. The double-sided expanded plate riveting structure as claimed in claim 1, wherein the folded portion is a two-segment folded portion, including a first vertical segment and a second vertical segment, the first vertical segment and the second vertical segment are located at one side of the bottom end of the upright portion, a lower end of the first vertical segment is connected to the bottom end of the upright portion, an upper end of the first vertical segment is connected to an upper end of the second vertical segment, and the second vertical segment is sandwiched between the first vertical segment and the side of the bottom end of the upright portion.

4. The double-sided expanded plate riveting structure as claimed in claim 1, wherein the folded portion is a three-segment folded portion, including a first vertical segment, a second vertical segment and a third vertical segment, the first vertical segment and the second vertical segment are located at one side of the bottom end of the upright portion, a lower end of the first vertical segment is connected to the bottom end of the upright portion, an upper end of the first vertical segment is connected to an upper end of the second vertical segment, the third vertical segment is located at another side of the bottom end of the upright portion, and a lower end of the third vertical segment is connected to a lower end of the second vertical segment.

* * * * *